United States Patent [19]
Borgelt et al.

[11] 3,986,263
[45] Oct. 19, 1976

[54] DENTAL INSTRUMENT DELIVERY SYSTEM

[75] Inventors: Burton Cook Borgelt, Toledo, Ohio; Cornelius Keith Vandervelden, Kansas City, Mo.

[73] Assignee: Litton Industrial Products, Inc., Beverly Hills, Calif.

[22] Filed: June 22, 1973

[21] Appl. No.: 372,492

[52] U.S. Cl. ............................................. 32/22
[51] Int. Cl.$^2$ ..................................... A61C 19/02
[58] Field of Search .............. 32/22; 248/145, 130, 248/425, 163, 432, 349

[56] References Cited
UNITED STATES PATENTS

| | | | |
|---|---|---|---|
| 3,143,803 | 8/1964 | Lunn | 32/22 |
| 3,311,411 | 3/1967 | Page et al. | 32/22 |
| 3,445,934 | 5/1969 | Harris | 32/22 |
| 3,530,513 | 9/1970 | Maurer et al. | 32/22 |
| 3,662,465 | 5/1972 | Heubeck | 32/22 |
| 3,755,899 | 9/1973 | Betush | 32/22 |
| 3,771,226 | 11/1973 | Lieb et al. | 32/22 |
| 3,823,475 | 7/1974 | Heubeck | 32/22 |

OTHER PUBLICATIONS
"TM" Publication, Time Motion System Co., 1971.

Primary Examiner—Robert Peshock
Assistant Examiner—Jack Q. Lever
Attorney, Agent, or Firm—Robert M. Vargo

[57] ABSTRACT

A dental instrument delivery system is disclosed that not only provides for the needs of the doctor, but comfortably accommodates the dental assistant. The delivery system comprises a pair of dental units individually mounted on swivels to be positioned about a dental chair. The first dental unit includes a work surface and a control module having a plurality of air-driven handpieces and a three-way syringe mounted thereon. The second unit also includes a work surface along with having various handpieces, such as a syringe, evacuator, and saliva ejector mounted thereon. Each of the swivels supporting a respective dental unit includes a pair of pivotally interconnected legs which are connected to a common pivot point located on a base having a support structure which is positioned below the base of the dental chair. This construction enables the dental units to be moved freely about the chair and also to be easily interchanged from the right to the left hand positions.

6 Claims, 9 Drawing Figures

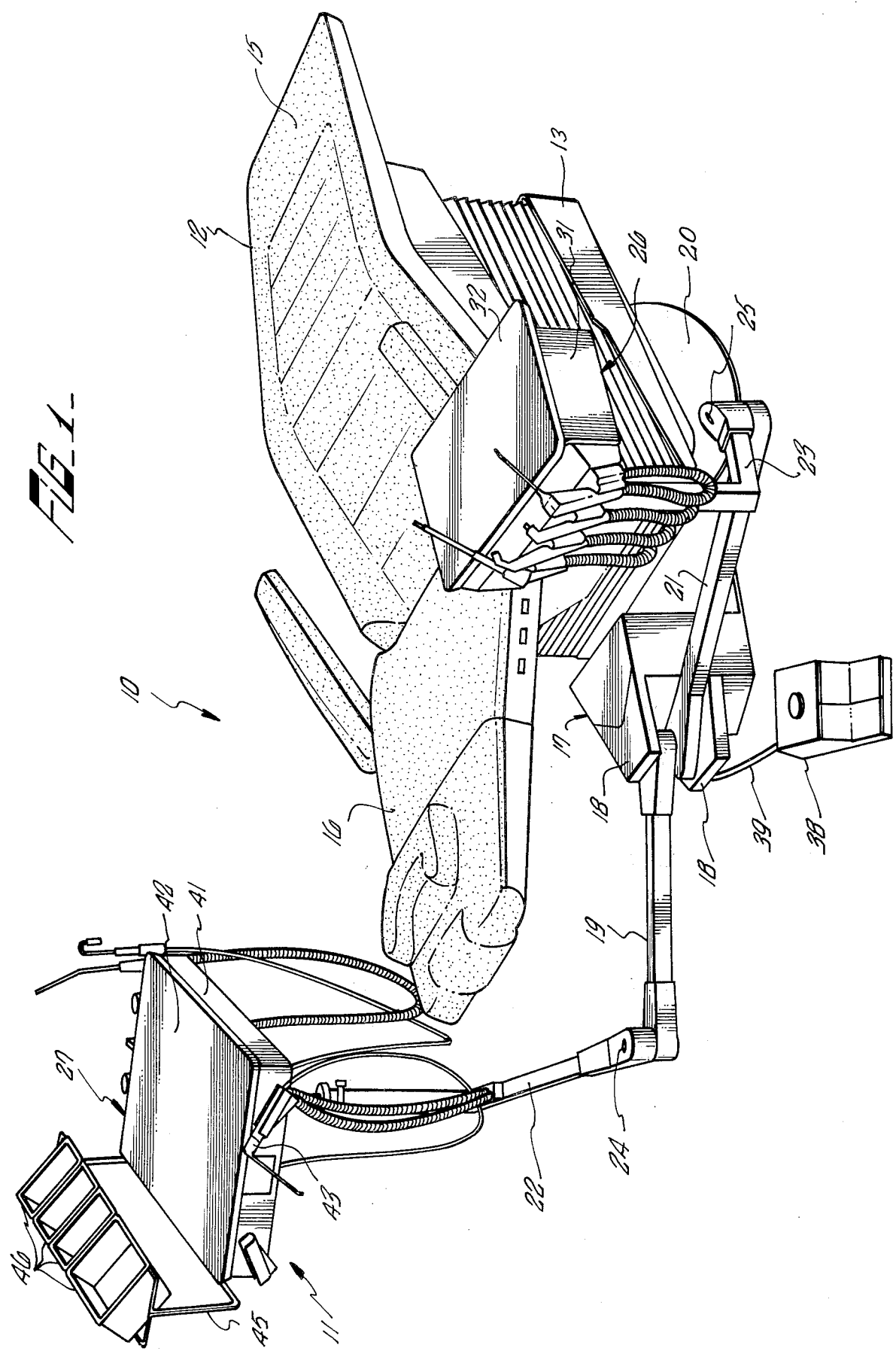

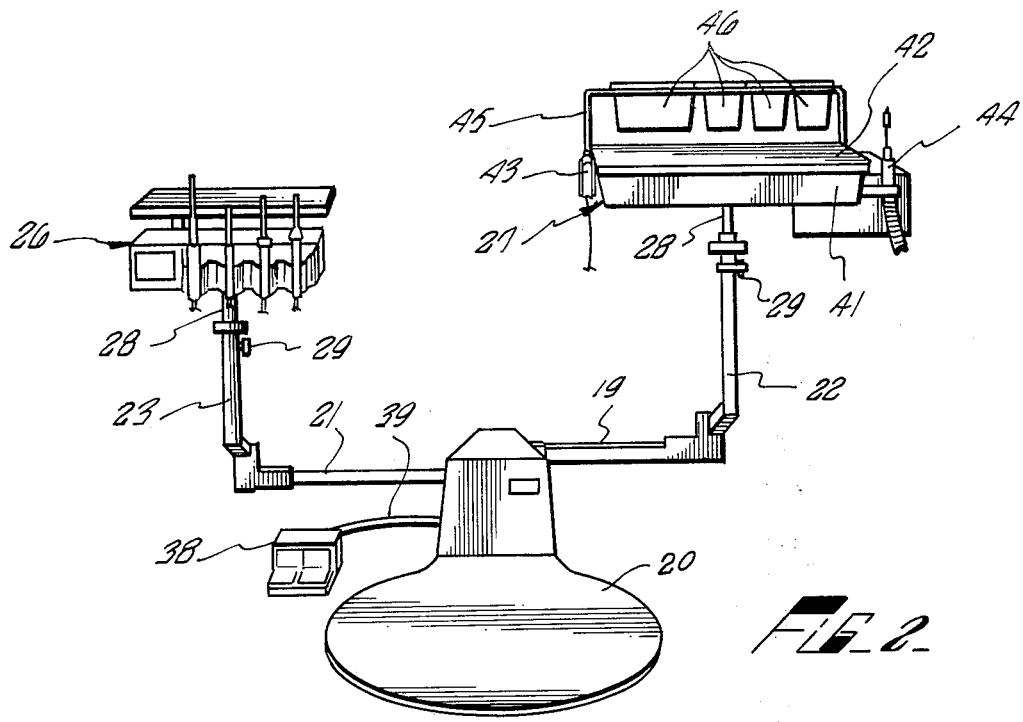
FIG_2
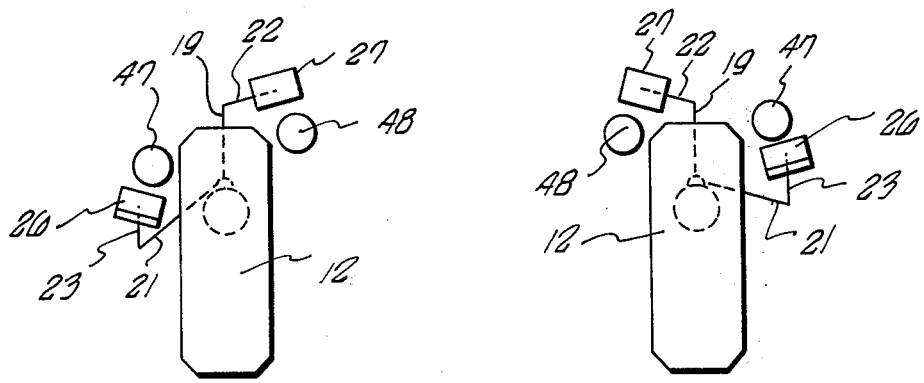
FIG_5  FIG_6
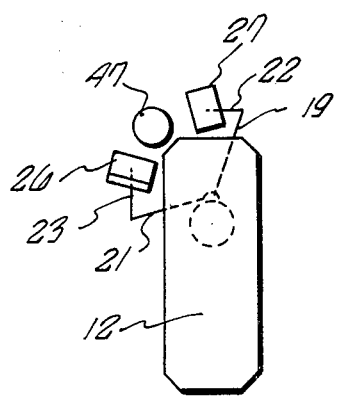
FIG_7

DENTAL INSTRUMENT DELIVERY SYSTEM

BACKGROUND OF THE INVENTION

1. Field of the Invention

The present invention relates generally to dental operatories and more particularly to dental instrument delivery systems.

2. Description of the Prior Art

Present day conventional dental operatories are capable of accommodating individual doctors. Each operatory consists mainly of a dental chair having an instrument delivery unit positioned adjacent thereto. The instrument delivery unit is usually mounted either on a fixed cabinet or on a pivotally mounted support. A typical instrument delivery unit supports a number of powered handpieces along with air and water syringes. In addition, such a unit usually includes an instrument tray for providing a work surface.

There are several shortcomings associated with the prior art dental instrument delivery systems.

One serious shortcoming is that the present day dental operatories do not adequately accommodate the dental assistants.

Dental assistants, which include nurses, paramedics and other auxiliaries, have become increasingly important, particularly in light of the evolution of the "team" concept, which has been propounded by the U.S. Public Health Agency. In accordance with this concept, the auxiliaries are trained to perform all dental procedures except diagnoses, cutting hard and soft tissues, administering drugs, treatment planning, and master impressions. Accordingly, the auxiliaries would perform the reversible operations while the doctors would perform the irreversible operations.

The reason that the team concept has become very important is that the rate of growth of the number of dentists is not sufficient to handle the greater increasing patient load. Because of this fact, team methods are necessary in order to increase productivity and accommodate the increased patient load.

As stated above, present day dental operatories cannot adequately accommodate dental auxiliaries. In most installations, the auxiliary must fend for herself by squeezing around corners, peering over the dentist's shoulders, or otherwise occupying the same work space as the dentists. In some installations, a separate, movable cart is provided for the auxiliary. However, the problem with such carts is that the umbilicals are usually strewn over the floor. This not only creates a hazard, but the umbilicals make cleaning difficult.

Another shortcoming with the present day dental operatories is that they usually do not accommodate left-handed dentists. This is because most delivery units are located on the right side of the dental chair. For this reason, most left-handed dentists must learn to work right-handed or else work in very uncomfortable positions.

In summary, present day dental operatories simply do not provide for the complete needs of future dental practices.

SUMMARY OF THE INVENTION

The present invention obviates the above-mentioned shortcomings by providing a dental operatory that can comfortably accommodate a dentist and an auxiliary.

In its broadest aspect, the present invention relates to a dental instrument delivery system comprising a pair of dental units individually mounted on swivels which in turn is mounted on a base having support structure adapted to be positioned below the base of a dental chair. The swivel construction enables the dental units to be moved freely about the dental chair. Moveover, the swivels permit the dental units to be easily interchanged from the right to left-hand positions to accommodate either right or left-handed dentists.

A primary advantage of the apparatus of the present invention is that it minimizes fatigue by limiting the number of movements that the operator and his assistant have to make.

Another advantage of the apparatus of the present invention is that the umbilicals are passed through the swivels and do not lie on the floor, thereby reducing the hazards and making cleaning easier.

Another primary advantage of the apparatus of the present invention is that the operatory can either accommodate an individual operator, or an operator and auxiliary to thereby enable solo or team procedures to be utilized.

The features of the present invention which are believed to be novel are set forth with particularity in the appended claims. The present invention, both as to its organization and manner of operation, together with the further advantages thereof, may best be understood by reference to the following description, taken in connection with the accompanying drawings.

BRIEF DESCRIPTION OF THE DRAWINGS

FIG. 1 is a perspective view of the dental instrument delivery system in accordance with the present invention;

FIG. 2 is a perspective view of the dental instrument delivery system without the dental chair;

FIG. 5 is a schematic view of the operatory shown in its right-handed position;

FIG. 6 is a schematic view of the operatory shown in its left-handed position; and FIG. 7 is a schematic view of the operatory shown in its solo position.

DESCRIPTION OF THE PREFERRED EMBODIMENT

Figure 3:
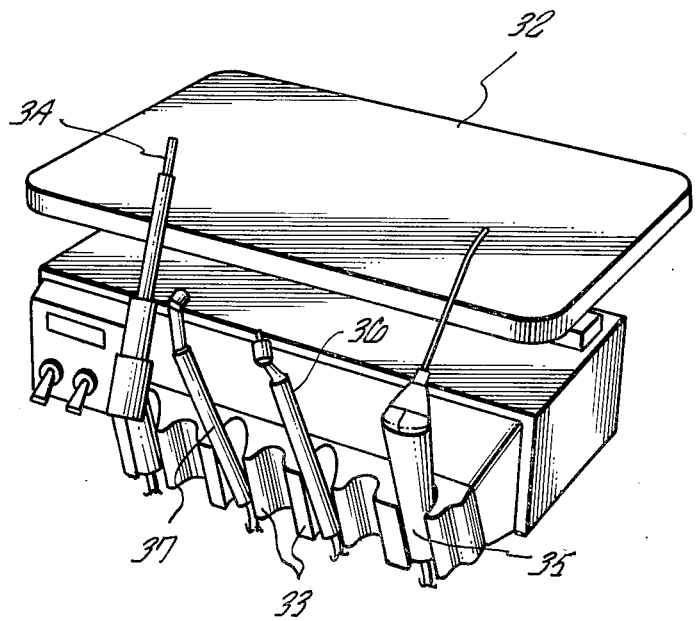
FIG. 3 is an enlarged view of the operator's unit.

Referring now to the drawings, FIG. 1 illustrates a dental operatory generally indicated by arrow 10, having a dental instrument delivery system 11 positioned around a dental chair 12. The dental chair 12 may be of any conventional construction. The dental chair 12 illustrated in FIG. 1 is described in Assignee's copending United States Design Application, Ser. No. 342,698 filed Mar. 19, 1973. The dental chair 12 includes a base 13 having an accordion-like support structure 14 mounted thereon. The seat portion 15 includes a back portion 16 which is pivotally supported at the back side thereof to enable the patient to be positioned in a reclining posture.

The dental instrument delivery system 11 includes a utility compartment 17 which is mounted on a base plate 20 mounted below the base 13 of the dental chair 12. FIG. 2 more clearly shows the base plate 20 which is constructed in a low profile to easily accommodate any style of dental chair. The utility compartment 17 also includes the main pivot support structure for the delivery system. The pivot support is formed by the pair of flanges 18 extending out of the back side of the compartment 17 and having a pivot pin (not shown) extending vertically therebetween. A first pair of legs 19 and 21 is pivotally supported on the pivot pin to rotate about the pivot axis. The leg 19 is supported above the leg 21 and is of a shorter length than leg 21. A second pair of legs 22 and 23 is pivotally mounted at their one ends to the respective cantilevered ends of the legs 19 and 21. Each leg 22 and 23 is pitched upwardly from its respective pivot point 24 and 25 with the opposite ends thereof extending vertically to support an operator's unit 26 and an assistant's unit 27, respectively.

The operator's unit 26 is integrally connected to a support conduit 28 which is telescoped into the vertical portion of the leg 23. A set screw 29 is mounted on the horizontal portion of the leg 23 to lockingly engage the support conduit 28. These locking means enable the height of the operator's unit to be vertically adjustable. In a similar manner, the assistant's unit 27 is also integrally connected to a support conduit 28 which is telescoped within the vertical portion of the leg 22. Likewise, a set screw 29 is also mounted on the vertical portion of the leg 22 to lockingly engage the support conduit 28 for height adjustment.

As more clearly shown in FIGS. 2 and 3, the operator's unit 26 comprises a control module 31 having a tray 32 mounted thereon for providing a work surface. The control module 31 includes a plurality of handpiece holders 33, for supporting a plurality of powered handpieces 34, 35, 36, and 37. The handpiece 34 is preferably a slow-speed handpiece, while the handpieces 35 and 36 are high-speed handpieces. These handpieces may be either electrically, hydraulically, or pneumatically driven. The handpiece 35 is a circulating warm water three-way syringe. The delivery system also includes a foot control 38 operatively connected through a transmission line 39 which extends through the interior of the legs 21 and 23 to the control module 31 for activating the various handpieces.

Figure 4:
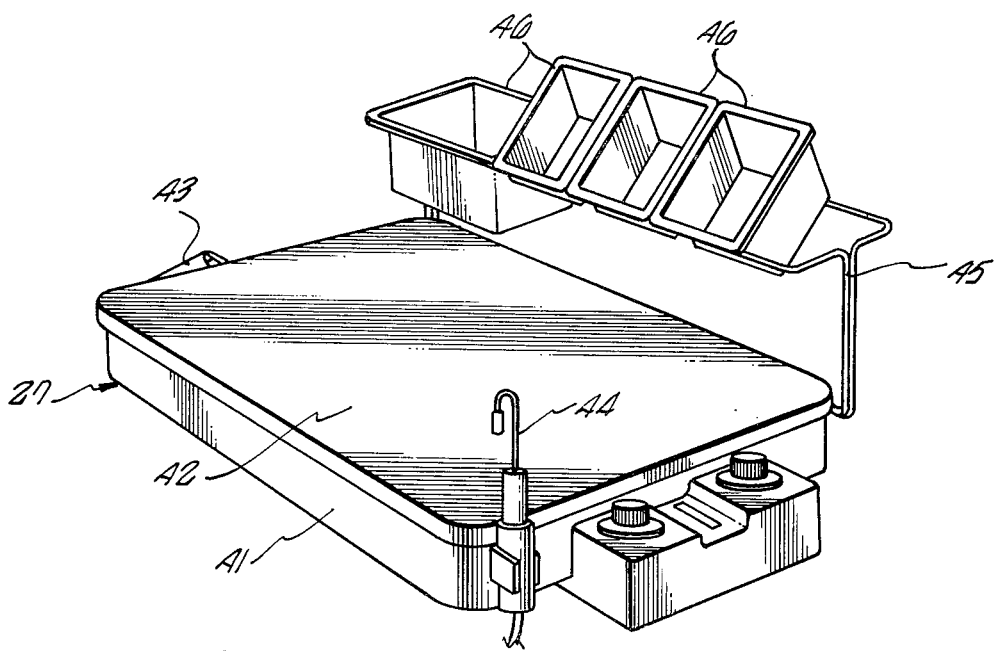
FIG. 4 is an enlarged view of the assistant's unit.

As more clearly shown in FIGS. 2 and 4, the assistant's unit 27 includes a base 41 having a tray 42 mounted thereon. The base 41 functions as a support for a three-way syringe 43 and various other handpieces 44 such as evacuators, saliva ejectors, etc. A rack 45 is also mounted on the base 41 and is adapted to support a plurality of bins 46. The bins 46 are utilized to contain add-on supplies such as needles, sponges, cotton rolls, etc. As shown in FIG. 4, the bins 46 can be canted to afford easy visibility.

It should also be noted that all of the umbilicals (either electrical, hydraulic, or pneumatic) extend through the interiors of the respective pairs of legs 19, 21, 22, and 23 into the utility compartment 17 to be connected to the various sources located within the floor beneath the utility compartment 17.

OPERATION

FIG. 5 shows a schematic view of the dental operatory 10 in its right-handed position. In this position, the operator's unit 26 is located on the right side of the dental chair as shown in FIG. 1. The doctor is seated on a movable chair (indicated by numeral 47) facing both the dental chair 12 and the operator's unit 26. The assistant is also located on a movable chair (indicated by numeral 48) facing the assistant's unit 27. In this position the doctor has powered handpieces 34–37 available directly before him to enable the doctor to operate the handpieces with his right hand. In this position, the doctor's left hand can extend around the patient's head in order to utilize picks, probes, and mirrors typically used by doctors. These probes are usually placed on the assistant's unit 27 and are handed to the doctor by the assistant. It should be noted that, in this position, the instruments do not pass in front of the patient's face.

During the operating procedure, the assistant is conveniently located to tend to the conventional auxiliary operations such as rinsing, aspirating, etc. Should the doctor wish to operate from the left side because he is left-handed, all that is required is to swivel the legs 19 and 21 to enable the operator's and assistant's units 26 and 27 to be interchanged from the right to the lefthand position, as shown in FIG. 6. This reversing operation can be done without any interference, since the leg 19 is shorter than leg 21 and its outer end passes inside the outer end of the leg 21.

Should it become necessary for the doctor to operate by himself, both units 26 and 27 can be positioned adjacent the doctor to enable the instruments and work surfaces to be readily accessible to him.

An important advantage of the operatory of the present invention is that it is designed to minimize fatigue by limiting the number of movements the operator and the assistant have to make. Heretofore, prior art systems may have effectively reduced the number of movements that the operator had to make. However, the operatory of the present invention, in addition to accomplishing this goal, reduces the number of movements the assistant must make, thereby increasing the effectiveness of the team.

In addition to being interchangeable from the right to the left-hand position, another important advantage of the present invention is that the swivel legs do not interfere with the doctor's or the assistant's feet or legs. Moreover, there are no umbilicals on the floor to stumble over or make cleaning difficult. As can be seen, the dental instrument delivery system of the present invention provides unique advantages for the team concept of dental practice.

It should be noted that various modifications can be made to the apparatus while still remaining within the purview of the following Claims.

What is claimed is:

1. A dental instrument delivery system, comprising:
a first dental unit having a plurality of power-driven dental handpieces mounted thereon;
a second dental unit having a plurality of handpieces mounted thereon; and
means for pivotally supporting said first and second dental units individually, said support means including a first pair of legs pivotally connected at their ends to a common pivot point, said pivot point being located on a base having support structure which is adapted to be positioned below the base of a dental chair, said base including a utility compartment, each leg of said first pair of legs being pivotally connected at its other end to a respective leg of a second pair of legs, one of said first pair of legs being shorter than the other to enable the dental units to be interchanged from one side of the dental chair to the other.

2. The combination of claim 1, wherein each leg of said second pair of legs is pivotally connected to a respective dental unit.

3. The combination of claim 1, wherein each pair of legs is hollow to form a continuous interior path from each dental unit to said utility compartment.

4. The combination of claim 3, further comprising transmission lines extending through each interior path to interconnect each dental unit with said utility compartment.

5. The combination of claim 3, wherein each dental unit is integrally connected to a hollow support bar which is adapted to telescope into a respective leg of said second pair of legs.

6. The combination of claim 5, further including a set screw mounted on each leg of said second pair of legs to engage a respective support bar to adjust the relative position of each support bar with its registering leg.

* * * * *